United States Patent
Rapp et al.

(10) Patent No.: US 12,286,082 B2
(45) Date of Patent: Apr. 29, 2025

(54) WIPER ARM DEVICE AND WIPER DEVICE

(71) Applicant: Robert Bosch GmbH, Stuttgart (DE)

(72) Inventors: Harald Rapp, Buehl (DE); Adam Ugron, Budapest (HU); Andrija Terentic, Belgrad (RS); Denis Parenta, Buehl (DE); Matea Mikulic, Novi Beograd (RS); Najdan Jocic, Pancevo (RS); Nikola Dilparic, Cacak (RS); Raf Greunlinx, Zolder (BE); Sascha Geissler, Lichtenau (DE); Stijn Truyens, Tienen (BE); Tanja Bosnic, Belgrad (RS)

(73) Assignee: Robert Bosch GmbH, Stuttgart (DE)

( * ) Notice: Subject to any disclaimer, the term of this patent is extended or adjusted under 35 U.S.C. 154(b) by 377 days.

(21) Appl. No.: 17/559,648

(22) Filed: Dec. 22, 2021

(65) Prior Publication Data

US 2022/0194325 A1 Jun. 23, 2022

(30) Foreign Application Priority Data

Dec. 23, 2020 (DE) .......................... 102020216566.1

(51) Int. Cl.
*B60S 1/48* (2006.01)
*B60S 1/34* (2006.01)
(Continued)

(52) U.S. Cl.
CPC ............. *B60S 1/488* (2013.01); *B60S 1/3415* (2013.01); *B60S 1/3862* (2013.01); *B60S 1/48* (2013.01);
(Continued)

(58) Field of Classification Search
CPC .. B60S 1/40; B60S 1/48; B60S 1/3862; B60S 1/522; B60S 1/524; B60S 1/3415; B60S 1/488; B60S 1/407
(Continued)

(56) References Cited

U.S. PATENT DOCUMENTS 10,202,105 B2 * 2/2019 Waible .................... B60S 1/524

FOREIGN PATENT DOCUMENTS

| DE | 102009048212 | * | 4/2011 | |
| DE | 102015215932 | * | 2/2017 | |
| WO | WO-0238426 A1 | * | 5/2002 | .............. B60S 1/488 |

OTHER PUBLICATIONS

Machine language translation of description portion of German publication 102009048212, published Apr. 2011. (Year: 2011).*
(Continued)

*Primary Examiner* — Gary K. Graham
(74) *Attorney, Agent, or Firm* — Michael Best & Friedrich LLP

(57) ABSTRACT

A wiper arm device (10*a*; 10*b*) having at least one wiper arm adapter (12*a*; 12*b*), having at least one fluidic coupling element (18*a*; 18*b*) for forming a fluidic connection with at least one wiper blade (62*a*; 62*b*), having at least one wiper arm rod (14*a*; 14*b*), having at least one fluid line (16*a*, 16*a*'; 16*b*, 16*b*') for transporting wiper fluid along the wiper arm rod (14*a*; 14*b*) to the fluidic coupling element (18*a*; 18*b*), and having an electrical heating line (20*a*, 20*a*'; 20*b*) which is arranged in the fluid line (16*a*, 16*a*'; 16*b*, 16*b*') for heating the fluid line (16*a*, 16*a*'; 16*b*, 16*b*'). The heating line (20*a*, 20*a*'; 20*b*) extends through the at least one fluid line (16*a*, 16*a*'; 16*b*, 16*b*') and is deflected at the fluidic coupling element (18*a*; 18*b*) to form a return through the fluid line (16*a*, 16*a*'; 16*b*, 16*b*').

8 Claims, 6 Drawing Sheets

(51) Int. Cl.
    *B60S 1/38*         (2006.01)
    *B60S 1/40*         (2006.01)
    *B60S 1/52*         (2006.01)
    *F16L 53/38*       (2018.01)

(52) U.S. Cl.
    CPC ............... *B60S 1/524* (2013.01); *F16L 53/38* (2018.01); *B60S 1/407* (2013.01)

(58) Field of Classification Search
    USPC .......................................... 15/250.04, 250.07
    See application file for complete search history.

(56) References Cited

OTHER PUBLICATIONS

Machine language translation of description portion of German publication 102015215932, published Feb. 2017. (Year: 2017).*
Machine language translation of description portion of WO publication 02/38426, published May 2002. (Year: 2002).*

* cited by examiner

WIPER ARM DEVICE AND WIPER DEVICE

BACKGROUND OF THE INVENTION

A wiper arm device having at least one wiper arm adapter, having at least one fluidic coupling element for forming a fluidic connection with at least one wiper blade, having at least one wiper arm rod, having at least one fluid line for transporting wiper fluid along the wiper arm rod to the fluidic coupling element, and having an electrical heating line which is arranged in the at least one fluid line for heating the at least one fluid line has already been proposed.

SUMMARY OF THE INVENTION

The invention is based on a wiper arm device having at least one wiper arm adapter, having at least one fluidic coupling element for forming a fluidic connection with at least one wiper blade, having at least one wiper arm rod, having at least one fluid line for transporting wiper fluid along the wiper arm rod to the fluidic coupling element, and having an electrical heating line which is arranged in the at least one fluid line for heating the at least one fluid line.

It is proposed that the at least one heating line extends through the at least one fluid line and is deflected at the fluidic coupling element to form a return through the at least one fluid line.

A "wiper arm device" is preferably intended to be understood to mean at least part, preferably a subassembly, of a window wiper. The wiper arm device can preferably also comprise the entire window wiper, in particular including a wiper blade. The wiper arm device is preferably provided for use on a vehicle. The wiper arm device, in particular as part of the window or windshield wiper, is preferably provided for cleaning a surface, preferably a window or windshield on a vehicle. The wiper arm device is preferably coupled to a vehicle, preferably a wiper arm drive of a vehicle, for cleaning a vehicle window. "Provided" should preferably, with preference especially, be understood to mean formed, designed, configured and/or equipped. Since an object is provided for a specific function, it is preferably intended to be understood that the object fulfills and/or executes this specific function in at least one use and/or operating state. An "operating state" is preferably intended to be understood to mean a state in which the wiper arm device is ready for a wiping process and/or a wiping mode and/or is in a wiping mode in which a wiper strip unit of the wiper blade, in particular of the window wiper, is preferably guided over a vehicle window and in so doing advantageously bears against the vehicle window.

The wiper arm rod preferably has a longitudinal axis. A "longitudinal axis" of an object is preferably intended to be understood to mean an axis which is oriented parallel to a longest edge of a smallest geometrical cuboid which only just fully encloses the object. The longitudinal axis of the wiper arm rod is preferably oriented at least substantially parallel to a longitudinal axis of the entire wiper blade device, in particular of the wiper blade, preferably at least in the operating state. Here, "substantially parallel" is intended to be understood to mean, in particular, an orientation of a direction relative to a reference direction, in particular in one plane, wherein the direction has a deviation of, in particular, less than 8°, advantageously less than 5° and particularly advantageously less than 2°, in relation to the reference direction.

The wiper arm rod preferably has a vehicle interface for forming a connection with the vehicle at one end of an extent of the wiper arm rod along the longitudinal axis of the wiper arm rod. The wiper arm adapter is preferably connected to the wiper arm rod at an end, which faces away from the vehicle interface, of the wiper arm rod. The wiper arm adapter is preferably formed as a side lock adapter. The wiper arm adapter is preferably connected to the wiper arm, in particular in a non-detachable manner, preferably in one piece. "In one piece" is preferably intended to be understood to mean connected at least integrally, for example by a welding process, an adhesive-bonding process, an injection-molding process and/or some other process that appears to be expedient to a person skilled in the art, and/or is advantageously intended to be understood to mean formed in a single piece, for example by being produced from a single mold and/or by being produced in an injection-molding process involving one or more components and advantageously from a single blank. The wiper arm adapter preferably comprises at least one pin element, in particular for forming a connection with a wiper blade adapter of the wiper blade. The pin element is preferably provided to be at least partially inserted into the wiper blade adapter. The pin element preferably defines a pivot axis about which, in particular, the wiper blade adapter is pivotably connected to the wiper arm adapter.

The wiper arm adapter preferably has a retaining clip. The retaining clip is preferably provided for preventing the wiper blade adapter from slipping off from the pin element of the wiper arm adapter, in particular in a direction of the insertion axis, in particular the pivot axis, and for preventing the wiper blade adapter from swiveling about the rotation axis at one point. The retaining clip is preferably oriented at least substantially perpendicularly to the longitudinal axis of the wiper arm adapter. Here, the expression "substantially perpendicularly" is intended to define, in particular, an orientation of a direction relative to a reference direction, wherein the direction and the reference direction, in particular when viewed in a projection plane, enclose an angle of 90° and the angle has a maximum deviation of, in particular, less than 8°, advantageously less than 5°, and particularly advantageously less than 2°.

The fluidic coupling element is preferably at least partially formed as a fluidic plug element, in particular a fluidic plug-in coupling element. The fluidic coupling element is preferably at least partially formed as a fluidic double plug element. The fluidic coupling element is preferably connected to the at least one fluid line. The wiper arm device preferably comprises at least two, in particular identical, fluid lines. The fluidic coupling element is preferably connected to the two fluid lines. The at least one fluidic coupling element is preferably formed as an end piece of the at least one fluid feed line. The at least one fluidic coupling element preferably delimits at least one fluid duct which is formed, in particular, in an angled manner, preferably at least by 45°, particularly preferably at least by 90°. A connection direction, in particular a plug-in direction, of the at least one fluidic coupling element is preferably oriented perpendicularly to a longitudinal axis of the wiper arm rod, in particular the wiper arm adapter, preferably at least in the connected state. The at least one fluidic coupling element preferably delimits at least two fluid ducts which run, in particular, parallel to one another within the fluidic coupling element.

The at least one fluid line preferably has a maximum extent which corresponds at least to a maximum extent of the wiper arm rod along the longitudinal axis of the wiper arm rod. The at least one fluid line preferably has a maximum extent which is longer than the maximum extent of the wiper arm rod along the longitudinal axis of the wiper arm rod. The at least one heating line preferably extends from an end, which faces away from the fluidic coupling element, in particular a vehicle end, of the at least one fluid line through the at least one fluid line, is connected to the fluidic coupling element and extends back through the at least one fluid line to the end, which faces away from the fluidic coupling element, of the at least one fluid line. The at least one heating line can extend from the end, which faces away from the fluidic coupling element, in particular the vehicle end, of the at least one fluid line through the at least one fluid line as far as an element of the fluidic coupling element from which the at least one heating line is suspended and/or to which the at least one heating line is connected. The at least one heating line can extend back through the same fluid line to the end, which faces away from the fluidic coupling element, in particular the vehicle end, of the at least one fluid line. The at least one heating line can extend from the end, which faces away from the fluidic coupling element, in particular the vehicle end, of the at least one fluid line through the at least one fluid line as far as an element of the fluidic coupling element from which the at least one heating line is, in particular, suspended and/or to which the at least one heating line is connected, and can extend back through the other of the at least two fluid lines to an end, which faces away from the fluidic coupling element, in particular the vehicle end, of the at least one other of the at least two fluid lines. The wiper arm device preferably comprises at least two heating lines which each extend out, in particular from the vehicle end to the fluidic coupling element, and back, in particular from the fluidic coupling element to the vehicle end, through one of the two fluid lines. The wiper arm device can comprise at least two heating lines which each extend out, in particular from the vehicle end to the fluidic coupling element, through one of the two fluid lines and each extend back, in particular from the fluidic coupling element to the vehicle end, through the other of the two fluid lines.

Owing to the configuration according to the invention of the wiper arm device, an advantageously direct heating power can be achieved in the at least one fluid line. In particular, an advantageously large heating power can be achieved in the at least one fluid line. In particular, advantageously rapid thawing of the fluid lines can be achieved. In particular, an antifreeze agent, advantageously in diluted form, can be used in a wiper fluid tank.

Furthermore, it is proposed that the at least one heating line has a maximum longitudinal extent within the fluid line, which maximum longitudinal extent is greater than the maximum longitudinal extent of the at least one fluid line at least by 10% of a maximum longitudinal extent of the at least one fluid line. The maximum longitudinal extent of the at least one heating line, in particular within the at least one fluid line, is preferably greater than the maximum longitudinal extent of the at least one fluid line at least by 20%, preferably at least by 50%, particularly preferably at least by 100%, of the maximum longitudinal extent of the at least one fluid line. The at least one heating line particularly preferably has a maximum longitudinal extent within the at least one fluid line that is twice the size of the maximum longitudinal extent of the at least one fluid line. The at least one heating line preferably extends from an electrical and fluidic connection element, through the at least one fluid line, to the fluidic coupling element and back. The at least two heating lines preferably have the same maximum longitudinal extent, in particular length. The at least two fluid lines preferably have the same maximum longitudinal extent, in particular length. The at least two fluid lines preferably extend next to one another, in particular at least substantially parallel, along the wiper arm rod, in particular from the electrical and fluidic connection element to the fluidic coupling element. A different heating line is preferably arranged in each fluid line. It is possible to achieve advantageously areal heating of the at least one fluid line. In particular, wiper fluid residues in the at least one fluid line, in particular over the entire length of the fluid line, can advantageously be prevented from freezing. In particular, advantageously uniform input of heat into the at least one fluid line can be achieved.

It is further proposed that the at least one fluidic coupling element has at least one hook element from/at which the at least one heating line, in particular in a central region of the heating line, is suspended, in particular deflected. The at least one fluidic coupling element preferably comprises a coupling main body. The at least one fluidic coupling element preferably comprises a stopper element. The coupling main body preferably forms at least two fluidic connection ports. At least one of the two fluidic connection ports is preferably provided for forming a connection with the at least one fluid line. At least one of the two fluidic connection ports is preferably provided for forming a connection with the fluidic connecting element. The coupling main body preferably delimits at least two bearing recesses for forming a connection with a cap element of the wiper arm adapter, in particular for being movably mounted on a component of the wiper arm device. The at least two fluidic connection ports are preferably oriented at a 90° angle in relation to one another, in particular up to a maximum deviation of at most 20°. The coupling main body preferably forms at least four fluidic connection ports. At least two of the four fluidic connection ports are preferably provided for forming a connection with the at least two fluid lines. At least two of the four fluidic connection ports are preferably provided for forming a connection with the fluidic connecting element. The coupling main body preferably delimits at least one heating fixing opening, in particular on an outer side which is situated opposite one of the connection ports. The heating fixing opening is preferably formed as a passage opening through which, in particular, an interior of the coupling main body can be reached. The at least one stopper element is preferably of pin-like form. The at least one stopper element is preferably provided for closing the heating fixing opening in a fluid-tight manner. The at least one hook element is preferably connected to the stopper element. The at least one hook element is preferably arranged at an end of a maximum longitudinal extent of the stopper element, which end is arranged in the coupling main body when the stopper element and the coupling main body are in a connected state. The at least one hook element is preferably designed to fix the at least one heating line. In particular, the at least one heating line can be clamped to the at least one hook element. As an alternative, the at least one heating line can be adhesively bonded to the at least one stopper element. In particular, the at least one heating line can be adhesively bonded, in particular in a fluid-tight manner, to the at least one stopper element at two different points. The at least one heating line can be advantageously fixed to the fluidic coupling element, so that, in particular, an input of heating power along the entire fluid line during a wiping process by the wiper arm device is still ensured.

Furthermore, it is proposed that the wiper arm device has an electrical wiper blade heating line which extends along the wiper arm rod outside the at least one fluid line for supplying the wiper blade with electrical energy. The at least one wiper blade heating line preferably extends along the wiper arm rod from the vehicle end of the wiper arm rod to the wiper arm adapter outside the at least one, in particular outside the at least two, fluid line/s. The at least one wiper blade heating line is preferably formed as a separate line to the at least one fluid line and to the at least one heating line. Advantageous separation of the fluid line electrics and the wiper blade heating electrics can be achieved. A particularly advantageous result may be that the fluid lines can be heated independently of a wiper blade.

It is further proposed that the wiper arm device has at least one electrical and fluidic connection element by way of which the at least one heating line can be connected to an electrical supply line and by way of which the at least one fluid line can be connected to a fluidic supply line. The at least one electrical and fluidic connection element preferably forms at least two, in particular at least four, fluidic connection main ports. One, in particular two, connection main port/s of the at least two, in particular at least four, connection main ports is preferably, are particularly, formed on the electrical and fluidic connection element for forming a connection with the at least one fluid line. One, in particular at least two, connection main port/s of the at least two, in particular at least four, connection main ports is preferably, are particularly, formed on the electrical and fluidic connection element for forming a connection with the fluidic supply line. The electrical supply line is preferably formed as part of the vehicle. The fluidic supply line is preferably formed as part of the vehicle. It is possible to achieve an advantageously compact, in particular stable, preferably robust, connection of the at least one fluid line and the heating line, which is arranged in the at least one fluid line, to the fluidic supply line and the electrical supply line.

Furthermore, it is proposed that an electrical connection direction of the electrical and fluidic connection element is oriented at least substantially perpendicularly to a fluidic connection direction of the electrical and fluidic connection element. The electrical and fluidic connection element preferably forms an electrical plug. The electrical plug is preferably arranged on a side of the electrical and fluidic connection element, which side faces away from the at least one connection main port which is designed for forming a connection with the at least one fluid line. The electrical plug is preferably arranged in alignment with the at least one connection main port which is designed for forming a connection with the at least one fluid line. A connection direction of the electrical plug is preferably oriented parallel to the connection direction of the at least one connection main port which is designed for forming a connection with the at least one fluid line. A connection direction of the electrical plug is preferably oriented perpendicularly to the connection direction of the at least one connection main port which is designed for forming a connection with the at least one fluidic supply line. The electrical plug preferably defines the electrical connection direction. The at least one connection main port, which is designed for forming a connection with the at least one fluidic supply line, preferably defines the fluidic connection direction of the electrical and fluidic connection element. An advantageously slip-resistant, in particular mutually securing, electrical and fluidic connection of the electrical and fluidic connection element to the electrical supply line and the fluidic supply line can be achieved.

It is further proposed that the wiper arm device has at least one further electrical connection element by way of which the at least one electrical wiper blade heating line can be connected to the electrical supply line and which is formed differently from the electrical and fluidic connection element. The at least one further electrical connection element is preferably connected to the wiper blade heating line at the vehicle end of the wiper arm rod for connecting the wiper blade heating line to the electrical supply line. Advantageously complete separation of the heating lines for the at least one fluid line and for the wiper blade can be achieved.

Furthermore, it is proposed that the electrical and fluidic connection element has at least one sealing element which separates an electrical connection region of the electrical and fluidic connection element from a fluidic connection region of the electrical and fluidic connection element. The at least one sealing element is preferably arranged between the electrical plug and the connection main ports. The connection main ports are preferably all connected to the same cavity. The sealing element preferably seals off the cavity from the electrical plug. The electrical plug preferably defines the electrical connection region of the electrical and fluidic connection element. The connection main ports and the cavity between the connection main ports preferably define the fluidic connection region of the electrical and fluidic connection element. It is possible to achieve an electrical and fluidic connection element which is advantageously safeguarded against an internal short circuit.

It is further proposed that the at least one heating line extends through the at least one fluid line from the electrical and fluidic connection element to the at least one hook element and back to the electrical and fluidic connection element. The at least one heating line preferably extends from the electrical and fluidic connection element through the at least one fluid line to the at least one hook element and back to the electrical and fluidic connection element through the at least one fluid line. The at least one heating line preferably extends from the electrical and fluidic connection element through the at least one fluid line to the at least one hook element and back to the electrical and fluidic connection element through the same fluid line. As an alternative, the at least one heating line can extend from the electrical and fluidic connection element through the at least one fluid line to the at least one hook element and back to the electrical and fluidic connection element through the other of the at least two fluid lines. In particular, as an alternative, the at least two heating lines can each extend from the electrical and fluidic connection element through one of the at least two fluid lines to the at least one hook element and back to the electrical and fluidic connection element through the other of the at least two fluid lines. An advantageously doubled input of heating power into the at least one fluid line can be achieved, in particular in comparison to the heating line extending once through the at least one fluid line.

Furthermore, a wiper or windshield wiper device comprising an, in particular the abovementioned, wiper blade and comprising a, in particular the abovementioned, wiper arm device according to the invention is proposed.

The wiper arm device according to the invention and/or the wiper device according to the invention are/is not intended to be restricted to the above-described use and embodiment here. In particular, in order to perform a function described herein, the wiper arm device according to the invention and/or the wiper device according to the invention can have a number of individual elements, components and units which differs from a number mentioned herein. In addition, in the case of the value ranges specified in this disclosure, the intention is also for values lying within the stated limits to count as being disclosed and usable in any desired way.

BRIEF DESCRIPTION OF THE DRAWINGS

Further advantages can be gathered from the following description of the drawing. The drawing illustrates two exemplary embodiments of the invention. The drawing, the description and the claims contain numerous features in combination. A person skilled in the art will expediently also consider the features individually and combine them to form expedient further combinations.

In the drawing.

DETAILED DESCRIPTION

Figure 1:
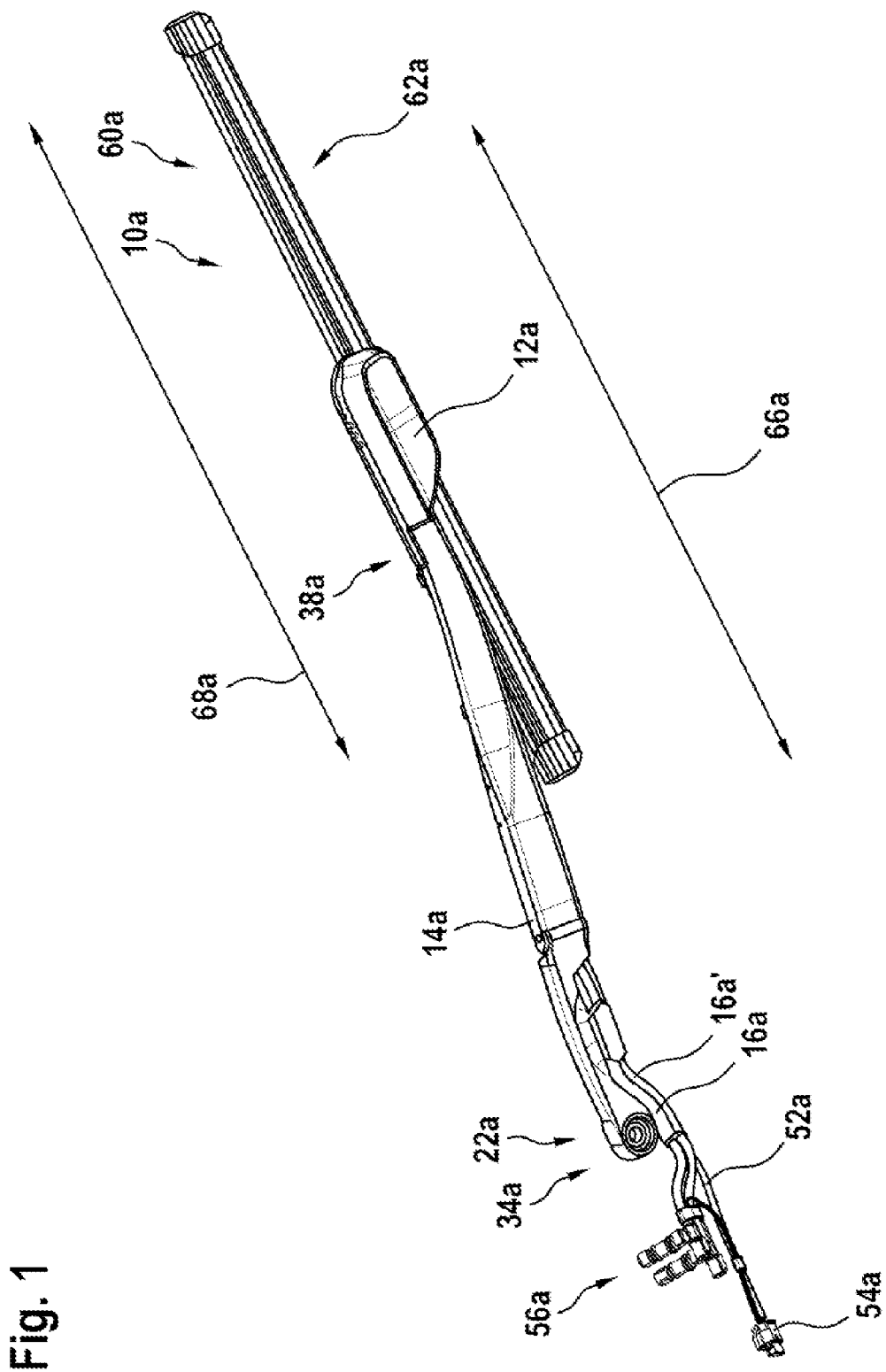
FIG. 1 shows a schematic illustration of a wiper device according to the invention comprising a wiper arm device according to the invention and comprising a wiper blade.
Figure 2:
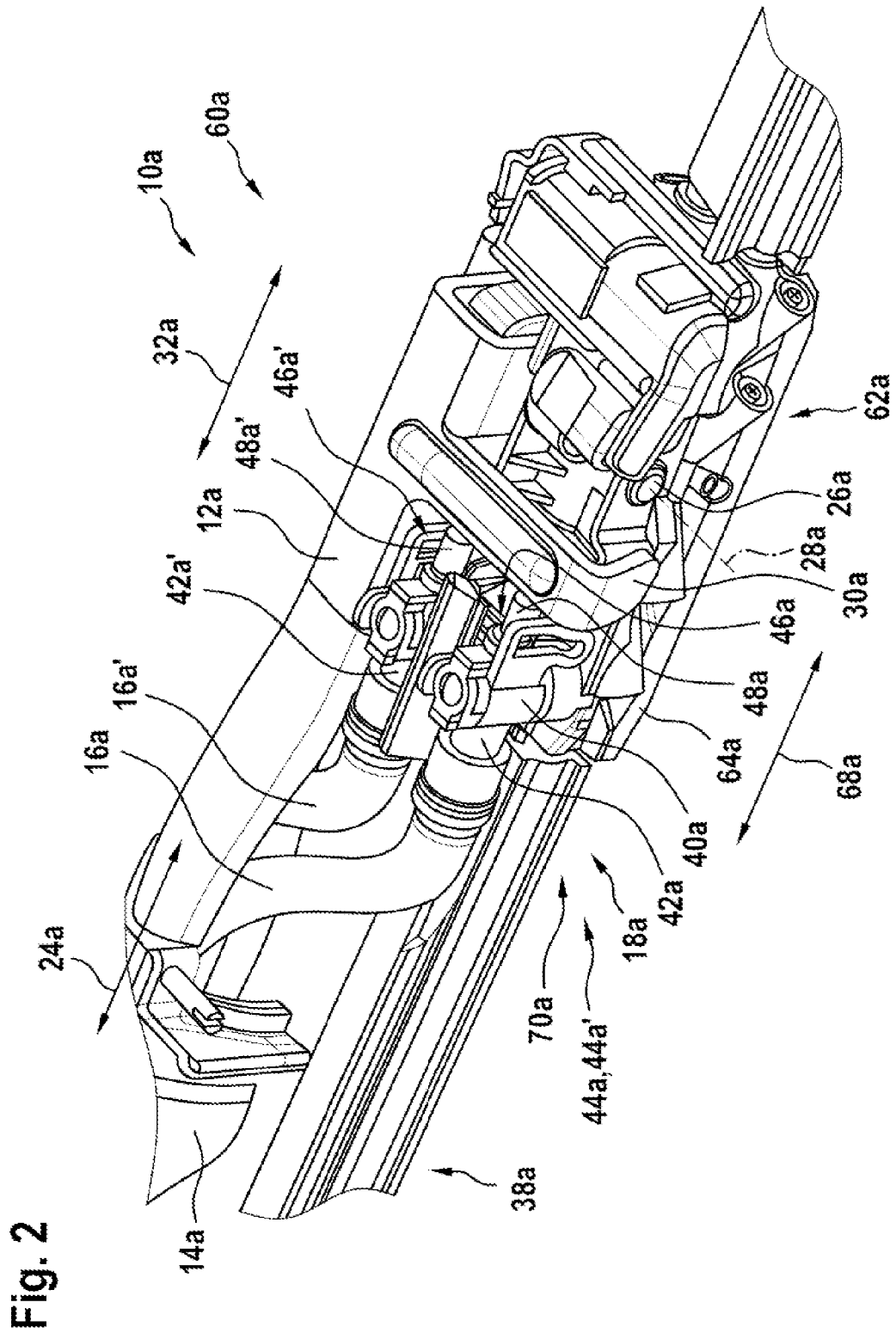
FIG. 2 shows a schematic illustration of part of the wiper arm device according to the invention and the wiper blade.

FIG. 1 and FIG. 2 show a wiper device 60a. The wiper device 60a comprises a wiper blade 62a. The wiper blade 62a comprises a wiper blade adapter 64a. The wiper blade 62a is provided for wiping a window of a vehicle. The wiper blade 62a has a longitudinal axis 66a. The wiper device 60a comprises a wiper arm device 10a.

The wiper arm device 10a comprises a wiper arm rod 14a. The wiper arm rod 14a has a longitudinal axis 24a. The longitudinal axis 24a of the wiper arm rod 14a is oriented parallel to a longitudinal axis 68a of the entire wiper device 60a up to a deviation of at most 30°. The wiper arm device 10a comprises a wiper arm adapter 12a. The wiper arm adapter 12a is designed to be connected to the wiper blade adapter 64a, in particular in order to connect the wiper blade 62a to the wiper arm rod 14a. The wiper arm adapter 12a is formed as a side lock adapter. The wiper arm adapter 12a is connected to the wiper arm rod 14a in one piece (cf. FIG. 2).

The wiper arm adapter 12a comprises a pin element 26a, in particular for forming a pivotable connection with the wiper blade adapter 64a of the wiper blade 62a. The pin element 26a is provided to be partially inserted into the wiper blade adapter 64a. The pin element 26a defines a pivot axis 28a about which, in particular, the wiper blade adapter 64a is pivotably connected to the wiper arm adapter 12a. The wiper arm adapter 12a has a retaining clip 30a. A longitudinal axis of the retaining clip 30a is oriented perpendicularly to a longitudinal axis 32a of the wiper arm adapter 12a up to a deviation of at most 15°.

Figure 3:
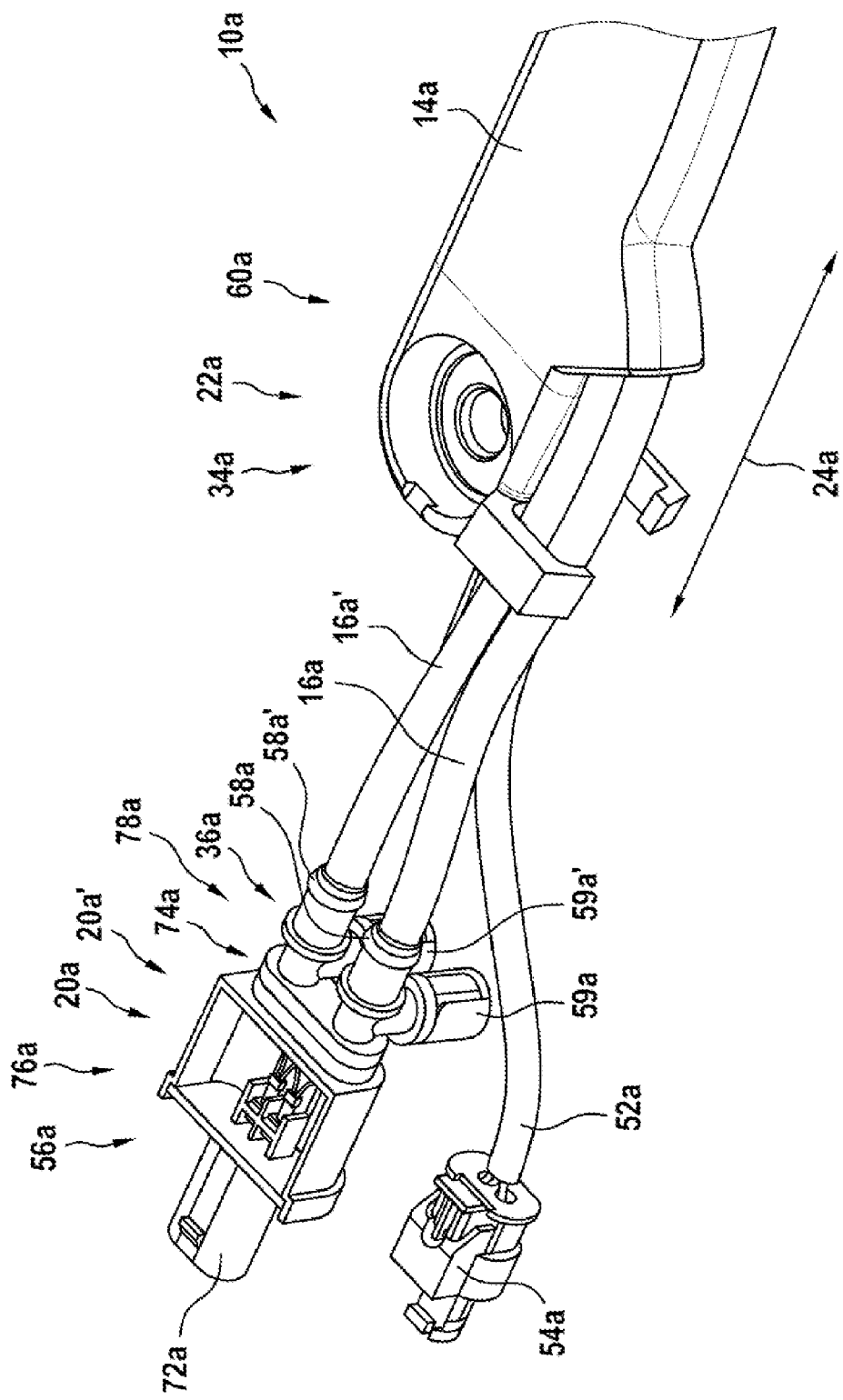
FIG. 3 shows a schematic illustration of a further part of the wiper arm device according to the invention.

The wiper arm rod 14a has a vehicle interface 34a, in particular for forming a connection with a vehicle, at one end, in particular a vehicle end 22a, of an extent of the wiper arm rod 14a along the longitudinal axis 24a of the wiper arm rod 14a. The wiper arm adapter 12a is connected to the wiper arm rod 14a at an end, which faces away from the vehicle interface 34a, in particular adapter end 38a, of the wiper arm rod 14a (cf. FIG. 3).

The wiper arm device 10a comprises two fluid lines 16a, 16a'. The fluid lines 16a, 16a' are designed for transporting wiper fluid along the wiper arm rod 14a to the fluidic coupling element 18a. The fluid lines 16a, 16a' are connected in portions to the wiper arm rod 14a, in particular at an end, which faces the wiper arm adapter 12a, of the wiper arm rod 14a, and in particular at a vehicle end 22a, which faces away from the wiper arm adapter 12a, of the wiper arm rod 14a. The two fluid lines 16a, 16a' have a maximum extent which is greater than a maximum extent of the wiper arm rod 14a along the longitudinal axis 24a of the wiper arm rod 14a. The two fluid lines 16a, 16a' are identical.

The wiper arm device 10a comprises two electrical heating lines 20a, 20a'. The heating lines 20a, 20a' are designed for heating the fluid lines 16a, 16a'. The heating lines 20a, 20a' are arranged in the fluid lines 16a, 16a'.

The wiper arm device 10a comprises a fluidic coupling element 18a. The fluidic coupling element 18a is designed for forming a fluidic connection with the wiper blade 62a. The fluidic coupling element 18a is formed as a fluidic plug element, in particular as a fluidic plug-in coupling element. The fluidic coupling element 18a is formed as a dual fluidic double plug element. The fluidic coupling element 18a is connected to the two fluid lines 16a, 16a'. The fluidic coupling element 18a is formed as an end piece of the two fluid lines 16a, 16a'.

The fluidic coupling element 18a comprises a coupling main body 40a. The coupling main body 40a forms four fluidic connection ports 42a, 42a', 44a, 44a'. Two connection ports 42a, 42a', 44a, 44a' of the four fluidic connection ports 42a, 42a', 44a, 44a' are connected to the two fluid lines 16a, 16a'. Two connection ports 44a, 44a' of the four fluidic connection ports 42a, 42a', 44a, 44a' are provided for forming a connection with a fluidic connecting element 70a of the wiper blade adapter 64a. Two connection ports 42a, 42a' of the four fluidic connection ports 42a, 42a', 44a, 44a' are oriented at a 90° angle to the two other connection ports 44a, 44a' of the four fluidic connection ports 42a, 42a', 44a, 44a'.

The coupling main body 40a delimits two heating fixing openings 46a, 46a', in particular on an outer side of the coupling main body 40a, which outer side is situated opposite the connection ports 42a, 42a' which are connected to the two fluid lines 16a, 16a'. The heating fixing openings 46a, 46a' are formed as passage opening through which, in particular, an interior of the coupling main body 40a can be reached.

The fluidic coupling element 18a, in particular the coupling main body 40a, delimits two fluid ducts which are formed in an angled manner, in particular by 90°, in particular in the interior. The two fluid ducts run parallel to one another within the fluidic coupling element 18a. The coupling main body 40a delimits two bearing recesses for forming a connection with a cap element (not shown) of the wiper arm adapter 12a, in particular for being movably mounted on a component of the wiper arm device 10a.

A connection direction, in particular a plug-in direction, of the fluidic coupling element 18a for forming a connection with the wiper blade adapter 64a is oriented perpendicularly to the longitudinal axis 24a of the wiper arm rod 14a, in particular the wiper arm adapter 12a, and perpendicularly to a longitudinal axis of the retaining clip 30, in particular the pin element 26, in particular to the rotation axis, in particular in a connected state.

The fluidic coupling element 18a comprises two stopper elements 48a, 48a'. The stopper elements 48a, 48a' are of pin-like form. The stopper elements 48a, 48a' close the heating fixing openings 46a, 46a' in a fluid-tight manner.

Figure 4:
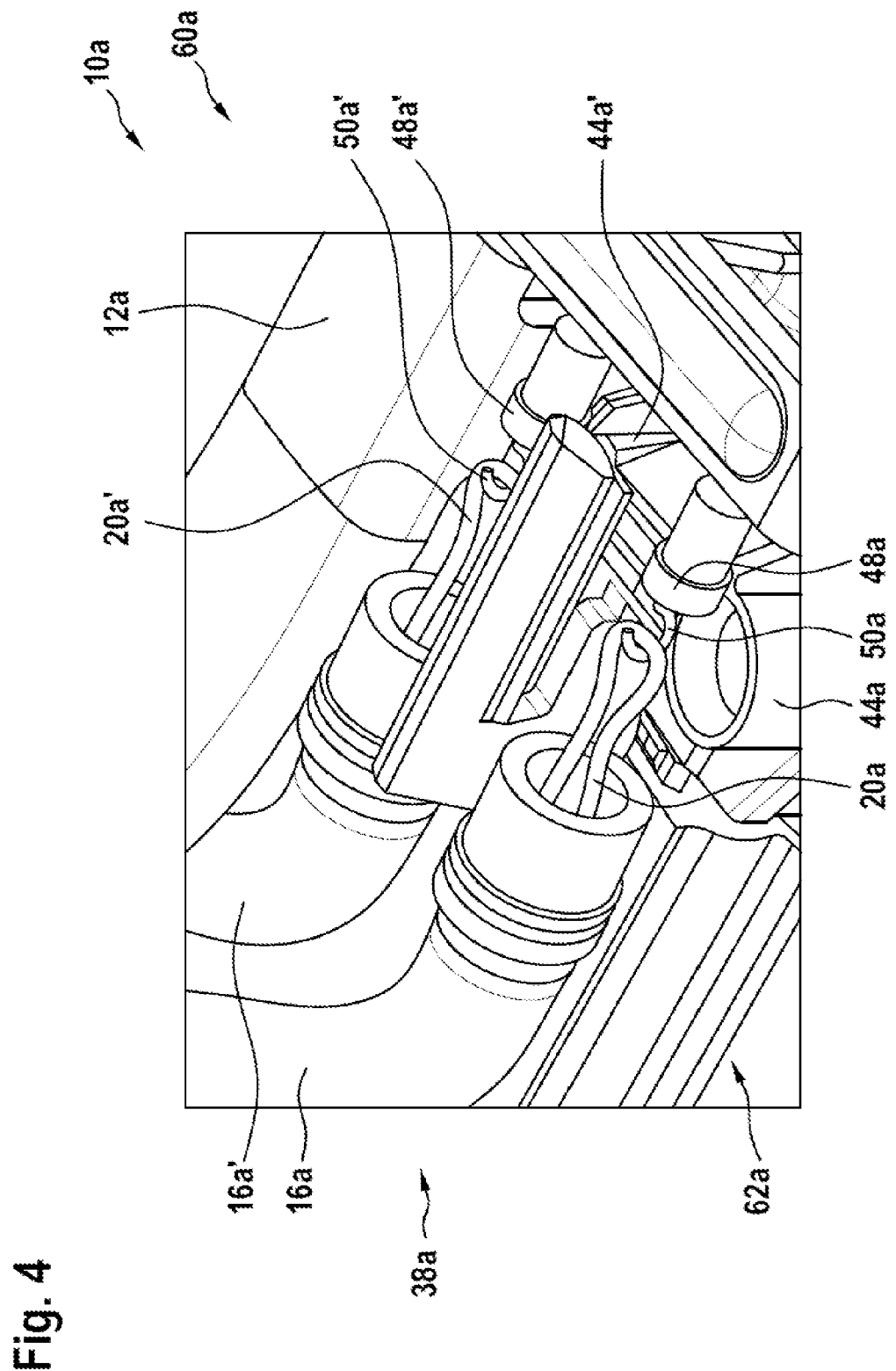
FIG. 4 shows a partially transparent schematic illustration of the wiper arm device according to the invention having the wiper blade.

The fluidic coupling element 18a has two hook elements 50a, 50a' (cf. FIG. 4). Each hook element 50a, 50a' is connected to one of the two stopper elements 48a, 48a'. The coupling main body 40a is illustrated in a transparent manner in FIG. 3 for the purpose of illustrating the stopper elements 48a, 48a' and the hook elements 50a, 50a'.

The hook elements 50a, 50a' are each arranged at an end of a maximum longitudinal extent of one of the stopper elements 48a, 48a', wherein the respective end is arranged in the coupling main body 40a when the stopper elements 48a, 48a' and the coupling main body 40a are in a connected state.

The hook elements 50a, 50a' are designed to fix the heating lines 20a, 20a'. The hook elements 50a, 50a' are designed to clamp the heating lines 20a, 20a'. The heating lines 20a, 20a' are each suspended, in particular deflected, in a central region of the heating lines 20a, 20a'.

The heating lines 20a, 20a' extend from an end, which faces away from the fluidic coupling element 18a, in particular a vehicle end 36a, of the fluid lines 16a, 16a' through the fluid lines 16a, 16a', are suspended from the fluidic coupling element 18a and extend back through the respective fluid line 16a, 16a' to the end, which faces away from the fluidic coupling element 18a, of the fluid lines 16a, 16a'. The heating lines 20a, 20a' extend from the end, which faces away from the fluidic coupling element 18a, in particular the vehicle end 36a, of the fluid lines 16a, 16a' through the fluid lines 16a, 16a' as far as the hook elements 50a, 50a' from which they are suspended, and extend in each case back through the same fluid line 16a, 16a' to the end, which faces away from the fluidic coupling element 18a, in particular the vehicle end 22a, of the fluid lines 16a, 16a'. The two heating lines 20a, 20a' each extend out, in particular from the vehicle end 36a to the fluidic coupling element 18a, and back, in particular from the fluidic coupling element 18a to the vehicle end 36a, through one of the two fluid lines 16a, 16a' in each case.

The wiper arm device 10a has an electrical wiper blade heating line 52a. The electrical wiper blade heating line 52a is designed for supplying the wiper blade 62a with electrical energy. The electrical wiper blade heating line 52a extends outside the two fluid lines 16a, 16a' along the wiper arm rod 14a.

The wiper blade heating line 52a extends outside the two fluid lines 16a, 16a' along the wiper arm rod 14a from the vehicle end 22a of the wiper arm rod 14a to the wiper arm adapter 12a. The at least one wiper blade heating line 52a is preferably formed as a separate line to the fluid lines 16a, 16a' and to the heating lines 20a, 20a'.

The wiper arm device 10a has at least one electrical and fluidic connection element 56a. The wiper arm device 10a has a further electrical connection element 54a. The further connection element 54a is formed differently from the electrical and fluidic connection element 56a (cf. FIG. 2).

The electrical wiper blade heating line 52a can be connected to an electrical supply line by way of the further connection element 54a. The further electrical connection element 54a is connected to the wiper blade heating line 52a at the vehicle end 22a of the wiper arm rod 14a for connecting the wiper blade heating line 52a to the electrical supply line.

The heating lines 20a, 20a' can be connected to the electrical supply line by way of the electrical and fluidic connection element 56a. The fluid lines 16a, 16a' can be connected to a fluidic supply line by way of the electrical and fluidic connection element 56a. The electrical supply line is formed as part of the vehicle. The fluidic supply line is formed as part of the vehicle.

The electrical and fluidic connection element 56a forms four fluidic connection main ports 58a, 58a', 59a, 59a'. Two connection main ports 58a, 58a' of the four connection main ports 58a, 58a', 59a, 59a' on the electrical and fluidic connection element 56a are designed to form a connection with the fluid lines 16a, 16a'. Two connection main ports 59a, 59a' of the four connection main ports 58a, 58a', 59a, 59a' on the electrical and fluidic connection element 56a are designed to form a connection with the fluidic supply line. The electrical and fluidic connection element 56a is designed to establish a wiper fluid connection of the wiper arm device 10a to the vehicle. The electrical and fluidic connection element 56a is designed to establish an electrical supply connection of the wiper arm device 10a to the vehicle. The connection main ports 58a, 58a', 59a, 59a' are all connected to the same cavity.

An electrical connection direction of the electrical and fluidic connection element 56a is oriented perpendicularly to a fluidic connection direction of the electrical and fluidic connection element 56a.

The electrical and fluidic connection element 56a forms an electrical plug 72a. The electrical plug 72a is arranged on a side of the electrical and fluidic connection element 56a, which side faces away from the connection main ports 58a, 58a', which are designed for forming a connection with the at least one fluid line 16a, 16a'. The electrical plug 72a is arranged in alignment with the connection main ports 58a, 58a' which are designed for forming a connection with the fluid lines 16a, 16a'. A connection direction of the electrical plug 72a is preferably oriented parallel to the connection direction of the connection main ports 58a, 58a' which are designed for forming a connection with the fluid lines 16a, 16a'. A connection direction of the electrical plug 72a is oriented perpendicularly to the connection direction of the connection main ports 59a, 59a' which are designed for forming a connection with the at least one fluidic supply line. The electrical plug 72a defines the electrical connection direction of the electrical and fluidic connection element 56a. The two connection main ports 59a, 59a', which are designed for forming a connection with the fluidic supply line, define the fluidic connection direction of the electrical and fluidic connection element 56a.

The electrical and fluidic connection element 56a has a sealing element 74a. The sealing element 74a separates an electrical connection region 76a of the electrical and fluidic connection element 56a from a fluidic connection region 78a of the electrical and fluidic connection element 56a. The sealing element 74a keeps electricity away from the wiper fluid in the electrical and fluidic connection element 56a. The electrical plug 72a defines the electrical connection region 76a of the electrical and fluidic connection element 56a. The connection main ports 58a, 58a', 59a, 59a' and the cavity between the connection main ports 58a, 58a', 59a, 59a' define the fluidic connection region 78a of the electrical and fluidic connection element 56a. The sealing element 74a is arranged between the electrical plug 72a and the connection main ports 58a, 58a', 59a, 59a'. The sealing element 74a seals off the cavity from the electrical plug 72a.

One heating line 20a, 20a' of the two heating lines 20a, 20a' extends through one fluid line 16a, 16a' of the two fluid lines 16a, 16a' in each case. The heating lines 20a, 20a' extend through the fluid lines 16a, 16a' and are deflected at the fluidic coupling element 18a to form a return through the respective fluid line 16a, 16a' of the two fluid lines 16a, 16a'. The heating lines 20a, 20a' are of equal length. The heating lines 20a, 20a' have a maximum longitudinal extent within the fluid lines 16a, 16a', which maximum longitudinal extent is greater than the maximum longitudinal extent of one of the fluid lines 16a, 16a' at least by 10% of a maximum longitudinal extent of one of the fluid lines 16a, 16a'.

The heating lines 20a, 20a' each have a maximum longitudinal extent within the fluid lines 16a, 16a', which maximum longitudinal extent is twice the size of the maximum longitudinal extent of one of the fluid lines 16a, 16a'. The heating lines 20a, 20a' extend from the electrical and fluidic connection element 56a through the fluid lines 16a, 16a' to the fluidic coupling element 18a and back. The heating lines 20a, 20a' have the same maximum longitudinal extent, in particular length. The two fluid lines 16a, 16a' have the same maximum longitudinal extent, in particular length. The two fluid lines 16a, 16a' extend next to one another, in particular parallel, along the wiper arm rod 14a, in particular from the electrical and fluidic connection element 56a to the fluidic coupling element 18a. A different heating line 20a, 20a' is arranged in each of the fluid lines 16a, 16a'.

The heating lines 20a, 20a' extend through fluid lines 16a, 16a' from the electrical and fluidic connection element 56a to the hook elements 50a, 50a' and back to the electrical and fluidic connection element 56a. The heating lines 20a, 20a' extend from the electrical and fluidic connection element 56a through the fluid lines 16a, 16a' to the hook elements 50a, 50a' and back to the electrical and fluidic connection element 56a through the fluid lines 16a, 16a'. The heating lines 20a, 20a' each extend from the electrical and fluidic connection element 56a through one of the fluid lines 16a, 16a' to the hook elements 50a, 50a' and back to the electrical and fluidic connection element 56a through the same one of the fluid lines 16a, 16a'.

The wiper blade 62a has a heating tape which is arranged on spring rails of the wiper blade 62a. The wiper blade 62a has a male electrical connector which is soldered to the heating tape. The male electrical connector is latched to the wiper arm adapter 12a. The male electrical connector is latched to the wiper arm adapter 12a pivotably on the pin element 26a. The heating tape converts electrical energy into thermal energy. The heating tape distributes the thermal energy along the wiper blade 62a. The heating tape heats end caps, a wiper strip unit with a wiper lip and the wiper blade adapter 64a of the wiper blade 62a. Two heating line loops of the two heating lines 20a, 20a' are arranged on the wiper arm rod 14a. A respective heating line loop is arranged in one of the fluid lines 16a, 16a'. The heating lines 20a, 20a' are connected to the hook elements 50a, 50a' on the fluidic coupling element 18a for holding them in position in the event of a movement of the fluid lines 16a, 16a'.

Figure 5:
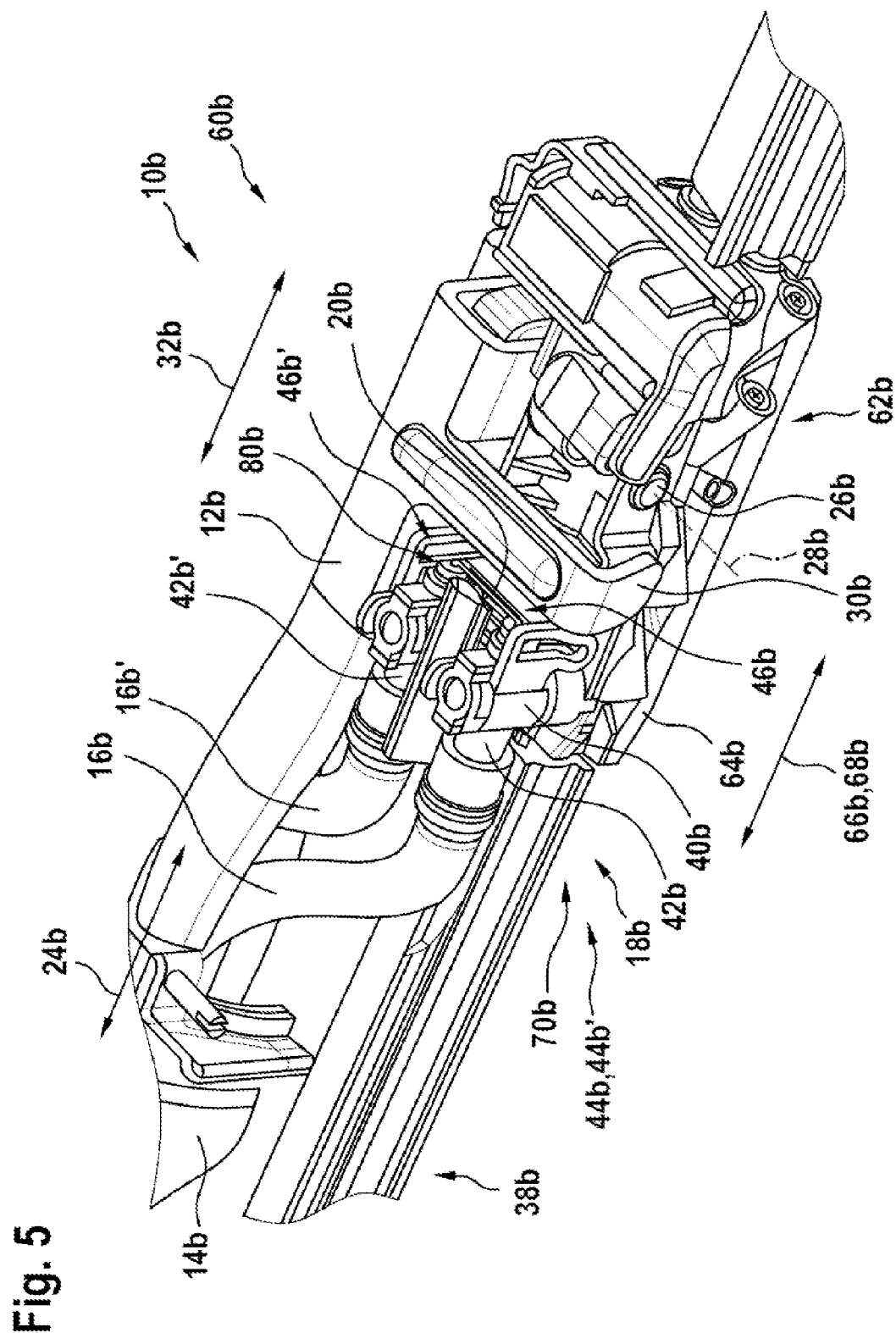
FIG. 5 shows a schematic illustration of part of an alternative wiper arm device according to the invention.
Figure 6:
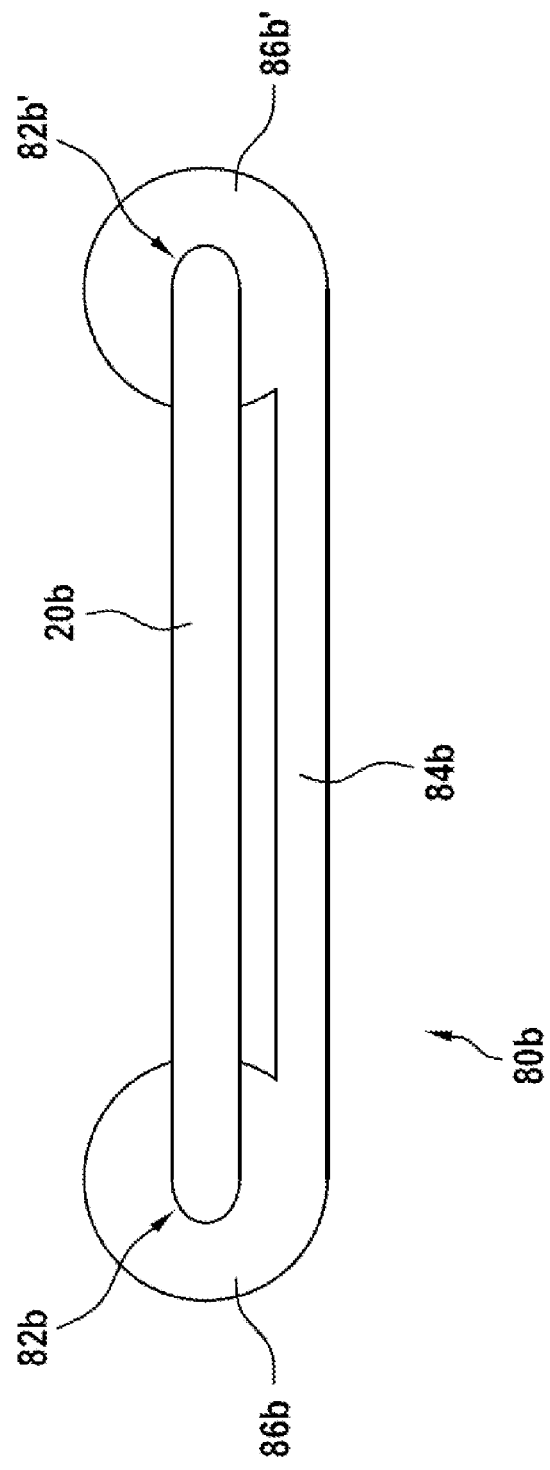
FIG. 6 shows a schematic illustration of a stopper element of the alternative wiper arm device according to the invention.

FIGS. 5 and 6 show a further exemplary embodiment of the invention. The following descriptions and the drawings are restricted essentially to the differences between the exemplary embodiments, wherein, as far as identically denoted components, in particular components with identical reference signs, are concerned, reference may also be made, in principle, to the drawings and/or the description relating to the other exemplary embodiments, in particular of FIGS. 1 to 4. In order to distinguish between the exemplary embodiments, the reference signs of the exemplary embodiment in FIGS. 1 to 4 are followed by the letter "a". In the exemplary embodiments of FIGS. 5 and 6, the letter a has been replaced by the letter "b".

FIG. 5 shows an alternative wiper device 60b. The wiper device 60b comprises a wiper blade 62b. The wiper blade 62b comprises a wiper blade adapter 64b. The alternative wiper device 60b comprises an alternative wiper arm device 10b.

The wiper arm device 10b comprises a wiper arm rod 14b. The wiper arm device 10b comprises two fluid lines 16b, 16b'. The wiper arm device 10b comprises a fluidic coupling element 18b. The wiper arm device 10b comprises an electrical heating line 20b. The wiper arm device 10b comprises an electrical and fluidic connection element 56b (cf. FIG. 1).

The alternative wiper arm device 10b is designed analogously to the wiper arm device 10a shown in the previous example, apart from an altered fluidic coupling element 18b and an altered arrangement of the two heating lines 20b, 20b'.

The fluidic coupling element 18b comprises a stopper element 80b (cf. FIG. 6). The stopper element 80b is formed by two, in particular pin-like, closure elements 86b, 86b' which are connected to one another by a connecting web 84b. The stopper element 80b closes two heating fixing openings 46b, 46b' on a coupling main body 40b in a fluid-tight manner. The fluidic coupling element 18b has no hook elements (cf. FIG. 5). The two closure elements 86b, 86b' each have adhesive bonding passage openings 82b, 82b' in which, in particular, the heating lines 20b, 20b' are adhesively bonded in a fluid-tight manner.

The heating line 20b extends from an end, which faces away from the fluidic coupling element 18b, in particular a vehicle end 36b (cf. FIG. 1), of the two fluid lines 16b, 16b' through one of the two fluid lines 16b, 16b' as far as the stopper element 80b of the fluidic coupling element 18b, to which stopper element the heating line 20b is adhesively bonded, and extends back through the other of the two fluid lines 16b, 16b' to the end, which faces away from the fluidic coupling element 18b, in particular the vehicle end 36b.

The heating line 20b extends from the electrical and fluidic connection element 56b through one of the two fluid lines 16b, 16b' to the stopper element 80b and back to the electrical and fluidic connection element 56b through the other of the two fluid lines 16b, 16b'.

The heating line 20b extends from the electrical and fluidic connection element 56b through one of the two fluid lines 16b, 16b' to the stopper element 80b, through the stopper element 80b, and back to the electrical and fluidic connection element 56b through the other of the two fluid lines 16b, 16b'.

The heating line 20b extends out, in particular from the vehicle end 36b to the fluidic coupling element 18b, through one of the two fluid lines 16b, 16b' and extends in each case back, in particular from the fluidic coupling element 18b to the vehicle end 36b, through the other of the two fluid lines 16b, 16b'.

The heating line 20b is adhesively bonded to the at least one stopper element 80b. The heating line 20b is adhesively bonded, in particular in a fluid-tight manner, to the at least one stopper element 80b at two different points. The heating line 20b is adhesively bonded, in particular in a fluid-tight manner, to the at least one stopper element 80b at the two heating fixing openings 46b, 46b'. The heating line 20b is adhesively bonded, in particular in a fluid-tight manner, to the at least one stopper element 80b at the two closure elements 86b, 86b' (cf. FIG. 5). The heating line 20b is deflected outside the fluidic coupling element 18b. The heating line 20b extends through each of the two fluid lines 16b, 16b' once in each case.

What is claimed is:

1. A wiper arm device having a wiper arm adapter (12a; 12b), having a fluidic coupling element (18a; 18b) for forming a fluidic connection with a wiper blade (62a; 62b), having a wiper arm rod (14a; 14b), having a fluid line (16a, 16a'; 16b, 16b') for transporting wiper fluid along the wiper arm rod (14a; 14b) to the fluidic coupling element (18a; 18b), and having an electrical fluid heating line (20a, 20a'; 20b) which is arranged in the fluid line (16a, 16a'; 16b, 16b')

for heating the fluid line (16a, 16a'; 16b, 16b'), wherein the electrical fluid heating line (20a, 20a'; 20b) extends through the fluid line (16a, 16a'; 16b, 16b') and is deflected at the fluidic coupling element (18a; 18b) to form a return through the fluid line (16a, 16a'; 16b, 16b'), wherein the wiper arm device further includes an electrical and fluidic connection element (56a; 56b) configured to connect the electrical fluid heating line (20a, 20a'; 20b) to an electrical supply line and configured to connect the fluid line (16a, 16a'; 16b, 16b') to a fluidic supply line, wherein the electrical and fluidic connection element (56a; 56b) includes an electrical plug (72a) extending in a first direction, a first connection main port (58a, 58a') extending in a second, opposite direction and forming a connection with the fluid line (16, 16a; 16b, 16b'), and a second connection main port (59a, 59a') extending in a third direction that is perpendicular to both the first direction and the second direction and that is configured to form a connection with the fluidic supply line, wherein the electrical and fluidic connection element (56a; 56b) further includes a sealing element (74a; 74b) which separates an electrical connection region (76a; 76b) of the electrical and fluidic connection element (56a; 56b) from a fluidic connection region (78a; 78b) of the electrical and fluidic connection element (56a; 56b), wherein the electrical connection region (76a; 76b) includes the electrical plug (72a), and wherein the fluidic connection region (78a; 78b) includes both the first connection main port (58a, 58a') and the second connection main port (59a, 59a'), wherein the wiper arm device further includes an electrical wiper blade heating line (52a; 52b) which extends along the wiper arm rod (14a; 14b) outside of the fluid line (16a, 16a'; 16b, 16b') for supplying the wiper blade (62a; 62b) with electrical energy, wherein the wiper arm device further includes an electrical connection element (54a; 54b) which is configured to connect the electrical wiper blade heating line (52a; 52b) to the electrical supply line, wherein the electrical connection element (54a; 54b) is separate from the electrical and fluidic connection element (56a; 56b), wherein both the electrical connection element (54a; 54b) and the electrical and fluidic connection element (56a; 56b) are located outside of the wiper rod (14a; 14b), such that the wiper arm rod (14a; 14b) is positioned between the wiper arm adapter (12a; 12b) and each of the electrical connection element (54a; 54b) and the electrical and fluidic connection element (56a; 56b), and wherein the the electrical fluid heating blade heating line (52a) is a separate line from the heating line (20a, 20a': 20b).

2. The wiper arm device according to claim 1, wherein the electrical fluid heating line (20a, 20a'; 20b) has a maximum longitudinal extent within the fluid line (16a, 16a'; 16b, 16b'), wherein the maximum longitudinal extent of the heating line is greater than a maximum longitudinal extent of the fluid line (16a, 16a'; 16b, 16b') at least by 10% of the maximum longitudinal extent of the fluid line (16a, 16a'; 16b, 16b').

3. The wiper arm device according to claim 1, wherein the fluidic coupling element (18a) has a hook element (50a) from/at which the electrical fluid heating line (20a, 20a') is suspended.

4. The wiper arm device according to claim 3, wherein the electrical fluid line (20a) extends through the fluid line (16a) from the electrical and fluidic connection element (56a) to the hook element (50a) and back to the electrical and fluidic connection element (56a).

5. A windshield wiper device comprising
the wiper arm device (10a; 10b) according to claim 1, and
a wiper blade (62a; 62b) connected to the wiper arm device.

6. The windshield wiper device according to claim 5, wherein the electrical fluid heating line (20a, 20a'; 20b) has a maximum longitudinal extent within the fluid line (16a, 16a'; 16b, 16b'), wherein the maximum longitudinal extent of the electrical fluid heating line is greater than a maximum longitudinal extent of the fluid line (16a, 16a'; 16b, 16b') at least by 10% of the maximum longitudinal extent of the fluid line (16a, 16a'; 16b, 16b').

7. The windshield wiper device according to claim 5, wherein the fluidic coupling element (18a) has a hook element (50a) from/at which the electrical fluid heating line (20, 20a') is suspended.

8. The wiper arm device according to claim 1, wherein the fluidic coupling element (18a; 18b) includes a coupling main body (40a) having a first fluidic connection port (42a) and a second fluidic connection port (44a), wherein the second fluidic connection port (44a) is orientated at 90 degrees relative to the first fluidic connection port (42a), wherein the coupling main body (40a) further includes a heating fixing opening (46a), wherein the fluidic coupling element (18a; 18b) further includes a stopper element (48a) of pin shaped form that closes the heating fixing opening (46a) in a fluid-tight manner, wherein the fluidic coupling element (18a) further includes a hook element (50a) arranged at an end of the stopper element (48a), wherein a loop end of the heating line (20a) extends over the second fluidic connection port (44a) to engage the hook element (50a).

* * * * *